(12) United States Patent
Sasagawa et al.

(10) Patent No.: US 6,454,452 B1
(45) Date of Patent: Sep. 24, 2002

(54) BACKLIGHT FOR LIQUID CRYSTAL DISPLAY DEVICE

(75) Inventors: Tomohiro Sasagawa; Akimasa Yuuki; Naoko Iwasaki; Sadayuki Matsumoto; Mitsuo Inoue; Kyoichiro Oda, all of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/692,200

(22) Filed: Oct. 20, 2000

(51) Int. Cl.[7] .......................... G02F 1/1335; F21V 8/00
(52) U.S. Cl. .................. 362/561; 362/31; 362/330; 362/339; 362/224; 349/65
(58) Field of Search .............................. 349/62, 64, 65; 362/31, 330, 339, 332, 561, 224; 385/129, 132, 901

(56) References Cited

U.S. PATENT DOCUMENTS

| 5,128,842 | A | * | 7/1992 | Kenmochi | 362/31 |
| 5,339,179 | A | * | 8/1994 | Rudisill et al. | 349/65 |
| 5,521,796 | A | * | 5/1996 | Osakada et al. | 362/31 |
| 5,838,403 | A | * | 11/1998 | Jannson et al. | 349/65 |
| 5,926,601 | A | * | 7/1999 | Tai et al. | 349/64 |
| 5,961,198 | A | * | 10/1999 | Hira et al. | 362/31 |
| 5,980,054 | A | * | 11/1999 | Fukui et al. | 362/31 |
| 6,139,162 | A | * | 10/2000 | Masaki | 362/31 |
| 6,164,799 | A | * | 12/2000 | Hirmer et al. | 362/330 |
| 6,231,200 | B1 | * | 5/2001 | Shinohara et al. | 362/31 |
| 6,241,358 | B1 | * | 6/2001 | Higuchi et al. | 362/31 |

FOREIGN PATENT DOCUMENTS

| EP | 545429 | * | 6/1993 | ............. 349/65 |
| JP | 3-31782 | | 3/1991 | |
| JP | 5-216030 | | 8/1993 | |
| JP | 5-79537 | | 10/1993 | |
| JP | 6-130387 | | 5/1994 | |
| JP | 7-159620 | | 6/1995 | |
| JP | 7-168026 | | 7/1995 | |
| JP | 8-254618 | | 10/1996 | |
| JP | 9-113730 | | 5/1997 | |
| JP | 9-269489 | | 10/1997 | |
| JP | 10-260640 | | 9/1998 | |
| JP | 10-282342 | | 10/1998 | |

OTHER PUBLICATIONS

Shoichi Matsumoto; *Sangyo Tosho*, "Liquid Crystal Display Technology", p. 255 (Nov. 8, 1996).

* cited by examiner

*Primary Examiner*—Alan Cariaso
(74) *Attorney, Agent, or Firm*—Leydig, Voit & Mayer, Ltd.

(57) ABSTRACT

A backlight provides uniform emanating light for a liquid crystal display. In the backlight, light emitted from a light source is incident on a receiving end surface of a light guide plate and emanates through a top surface toward a liquid crystal panel. A bottom surface includes a reflecting hollow wedge extending along the receiving end surface and varying in depth, as measured from the bottom surface, in correspondence with distance from the end surface. A dividing flat portion orthogonal to the reflecting hollow wedge divides the reflecting hollowed portion, and an output surface includes a prism having parallel ridges extending in a direction orthogonal to the receiving end surface.

15 Claims, 15 Drawing Sheets

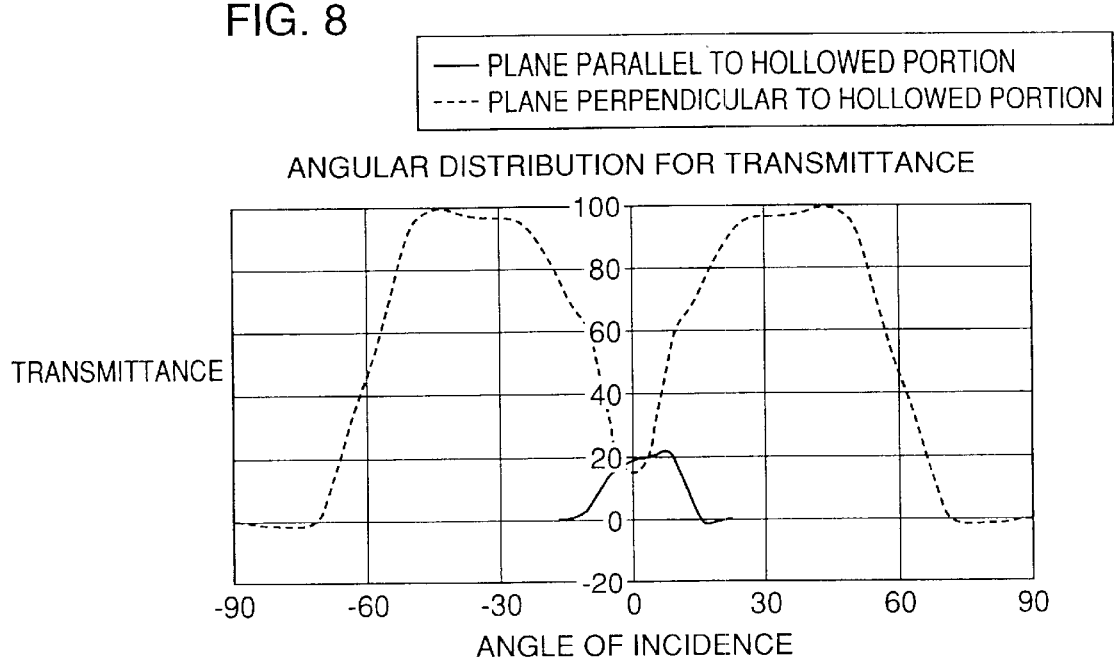
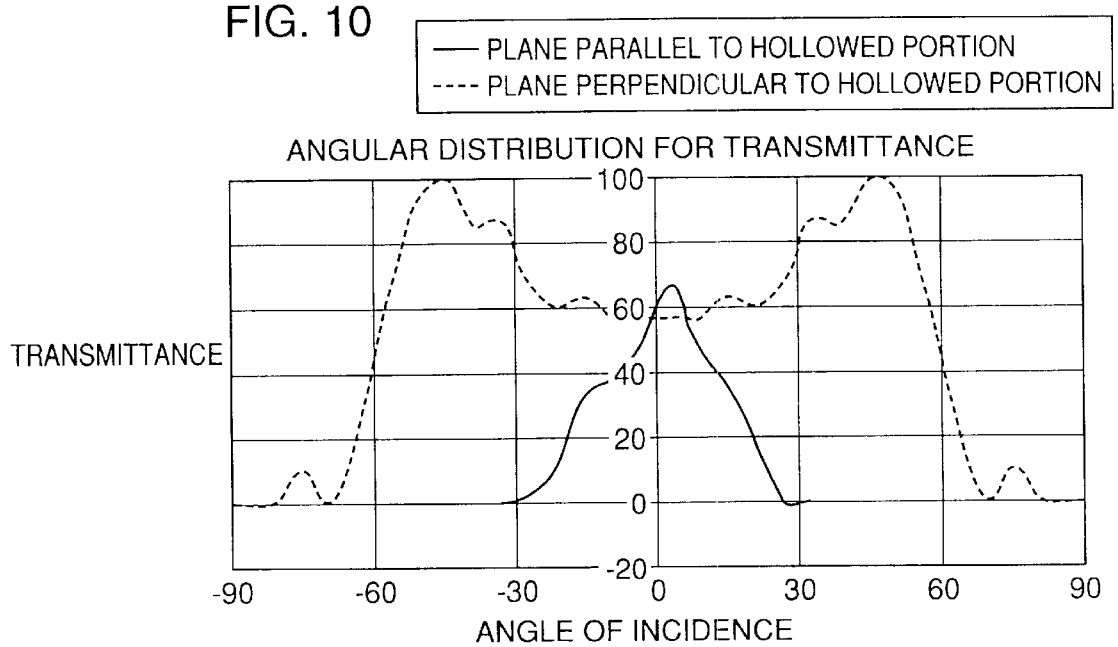

SHAPE OF CUTTING EDGE OF THREADING TOOL

SHAPE OF CUTTING EDGE OF THREADING TOOL

LIGHT

BACKLIGHT FOR LIQUID CRYSTAL DISPLAY DEVICE

BACKGROUND OF THE INVENTION

1. Field of the Invention

The present invention relates to backlights for liquid crystal display devices.

2. Description of the Related Art

FIG. 27 is a cross section of a conventional backlight for a liquid crystal display device (see for example *Liquid Crystal Display Technology.* edited by Shoichi Matsumoto, Sangyo Tosho, p. 255). As shown in FIG. 27, the backlight includes a cold cathode fluorescent lamp (CCFL) 101, a reflecting mirror 102, a light guide plate 103, a reflecting white dot pattern 110 having scattering dot elements regularly arranged to radially scatter light, a reflecting sheet 107, a prism sheet 111, and a scattering sheet 112.

The backlight operates as described below: CCFL 101 emits light, which is directly or via reflection provided by reflecting mirror 102 incident on light guide plate 103 via a receiving end plane 120 and propagates through the light guide plate in repeated total reflection provided by a bottom plane 122 and an output plane 121 before the light emanates from output plane 121. When white scattering dot 110, provided in bottom plane 122 of the light guide plate, receives light, the light scatters, passes through bottom plane 122 and thus emanates outside light guide plate 103. The light emanating from bottom plane 122 is reflected by reflecting sheet 7 and is thus incident on bottom plane 122 and repeats the total reflection described above before it emanates from output plane 121. The light emanating from the light guide plate has its distribution adjusted by one or two sheets of prism sheet 111 and scattering sheet 112 for eliminating a small uneven distribution of light and irradiates a liquid crystal panel (not shown) arranged in front of the backlight.

Such a backlight uses scattering dot 110 to extract light. As such, the exact light emanating from the light guide plate has a distribution having a large angle and it thus does not always have a direction in which it is visually recognized. As such, prism sheet 111 is required to effectively collect light to allow the light to have an adjusted distribution collected in the direction in which the light is visually recognized. As such, one or two sheets of expensive prism sheet 111 are required, as described above, which increases the number of members of the backlight and complicates the fabrication process.

In order to minimize the number of members of a backlight, there has been proposed a guide light plate having an optical prism integrated thereto, as shown in FIG. 28 (Japanese Patent Laying-Open No. 10-282342). With reference to FIG. 28, among the members as described above, light guide plate 103 includes a reflecting, grooved portion 104 extending in a direction in which the receiving end plane extends, corresponding to a hollow space in the form of a wedge extending in the direction of a depth of the light guide plate, and an uneven portion 106 in the form of a prism having a plurality of parallel ridges extending in a direction orthogonal to receiving end plane 120.

Light incident on light guide plate 103 via receiving end plane 120 repeats total reflection as it propagates through the light guide plate. When a reflecting hollowed portion receives light on its oblique plane closer to the receiving end plane it reflects the light upwards. The reflected light does not have the conditions for total reflection and thus emanates from output plane 121 without total reflection. Output plane 121 has an uneven portion in the form of a prism to provide a narrow distribution of light. As such, a prism sheet can be dispensed with in controlling a distribution of emanating light. In such a configuration as above, a hollowed portion in the form of a wedge is required to have a shape controlled to correspond to its position in the light guide plate to provide a uniform distribution in density of emanating light over different points in the light guide plate.

Since the conventional backlight is configured as above, it requires a large number of independent members to allow emanating light to have an appropriate distribution. As such it is costly. Furthermore, the backlight using the conventional light guide plate having an optical prism integrated therein has a reflecting hollowed portion in the form of a wedge regularly arranged and it thus hardly provides emanating light with a spatially uniform intensity.

SUMMARY OF THE INVENTION

The present invention contemplates a highly efficient, low-cost backlight capable of providing appropriate light distribution and providing control to allow emanating light to have a spatially uniform intensity.

The present invention provides a backlight for a liquid crystal display device including a rod-shaped light source supplying light for light radiation for displaying information on a liquid crystal panel and a flat light guide plate having a side receiving end surface parallel to the rod-shaped light source, an output surface arranged opposite and parallel to the liquid crystal panel, and a bottom surface facing the output surface in parallel. The bottom surface is provided with a reflecting prism having a reflecting hollowed portion in a form of a wedge extending along the receiving end surface and a dividing flat portion in a form of a strip extending orthogonal to the reflecting hollowed portion in the form of a wedge to divide the reflecting hollowed portion in the form of a wedge.

The backlight thus configured has a dividing flat portion dividing a reflecting plane in the form of a wedge providing reflection. As such, a prism sheet or the like can be dispensed with and a light guide plate suffices to emanate light having an appropriate light distribution. Furthermore, if its output surface is provided with a collecting prism, an uneven portion in the form of a prism of the output surface can effectively collect light to achieve high level of brightness. Furthermore, light emanating from the light guide plate can have a spatial distribution in intensity adjusted from example by changing both the reflecting hollowed portion in the form of a wedge in depth and the reflecting hollowed portion in the form of a wedge in width and the flat portion in width to consider their respective distances from the receiving end surface. As such, the backlight can be configured of a reduced number of members and hence at low cost to provide spatially uniform distribution and appropriate light distribution. More specifically, the above effect is obtained by gradually increasing in depth the reflecting hollowed portion in the wedge to consider its distance from the receiving end surface and by gradually decreasing in width the dividing flat portion to consider its distance from the receiving end surface. Thus the above effect can be readily achieved.

Desirably in the backlight the output surface is provided with a collecting prism having an uneven portion in the form of a prism with a plurality of parallel ridges extending in a direction orthogonal to the receiving end surface.

The output surface with a collecting prism arranged therein can provide high level of brightness in addition to appropriate distribution of light provided via a reflecting prism.

Furthermore, the present backlight can have the dividing flat portion in the form of a strip having a width that varies depending on its distance from the receiving end surface.

If the reflecting hollowed portion in the form of a wedge is changed only in depth to provide emanating light having spatially uniform distribution, the hollowed portion in a vicinity of the receiving end surface is required to have as extremely minute a height as approximately several μm. In contrast, if it is combined with a dividing flat portion of a strip having a variable width, then the reflecting hollowed portion in the vicinity of the receiving end surface can have a depth that is readily processed and the backlight can thus be readily manufactured. Furthermore, conventionally, as seen in a direction parallel to the receiving end surface, reflecting hollowed portions in the form of wedges are formed uniformly, having a single size, and in this direction emanating light can hardly be controlled to have uniform intensity. The dividing flat portion adjusted in width can provide uniformity in this direction.

Desirably in the present backlight the reflecting hollowed portion in the form of a wedge has a depth gradually increasing depending on a distance thereof from the receiving end surface.

In a light guide plate, light has the highest level of intensity around the receiving end surface and reduces in intensity as it is farther away from the receiving end surface. A reflecting hollowed portion in the form of a wedge greater in depth allows reflected light to have a higher level of intensity and hence light emanating through the output surface to have a higher level of intensity. As such, a reflecting hollowed portion in the form of a wedge that is increased in depth, as described above, allows emanating light to have a uniform distribution regardless of its distance from the receiving end surface.

Desirably in the present backlight the dividing flat portion in the form of a strip has a width gradually decreasing depending on a distance thereof from the receiving end surface.

A region corresponding to a dividing flat portion in the form of a strip is not provided with a reflecting hollowed portion in the form of a wedge. If the dividing flat portion in the form of a strip has a width decreasing depending on its distance from the receiving end surface, the reflecting hollowed portion in the form of a wedge accordingly gradually increases. As such, regardless of the distance from the receiving end surface, emanating light can have uniform intensity.

Desirably the present backlight includes the dividing flat portion in the form of a strip having a width of at least 10 μm.

If a dividing flat portion has a width of no less than 10 μm a hollowed portion in the form of a wedge can be processed without using a high-precision threading tool and the backlight can thus be readily manufactured. As such, there can be implemented a backlight at low cost that allows emanating light to have a spatially uniform distribution and provides an appropriate light distribution.

Desirably in the present backlight a flat portion having a width of at least 10 μm is provided between the reflecting hollowed portion in the form of a wedge and the reflecting hollowed portion in the form of a wedge adjacent thereto.

If there exists a flat portion provided between hollowed portions and having a width of no less than 10 μm, the hollowed portion can be processed without using a high-precision threading tool and the backlight can thus be readily manufactured. As such, there can be provided a backlight at low cost that emanates light having a spatially uniform distribution and an appropriate light distribution.

Desirably in the present backlight the flat portion between the hollowed portions is deeper in level than the dividing flat portion, as seen in a direction from the bottom plane towards an inner portion of the light guide plate.

A flat portion between hollowed portions is formed deeper in level than a dividing flat portion traversing in a direction in which a reflecting hollowed portion in the form of a wedge extends. As such, the hollowed portion is not required to be processed with high precision and the backlight can thus be readily manufactured. Thus, there can be provided a backlight at low cost that provides a spatially uniform distribution and an appropriate light distribution.

Desirably in the present backlight the reflecting hollowed portion in the form of a wedge has an oblique plane closer to the receiving end surface and having an angle α of 40° to 50° to the bottom surface.

The range of angle adopted as above reduces reflection at the uneven portion in the form of a prism of the output surface to emanate light highly efficiently with an appropriate light distribution. Thus, there can be provided a backlight at low cost that is highly efficient and also provides an appropriate light distribution.

Desirably in the present backlight the uneven portion in the form of a prism has a convexity with an apex angle β of at least 100°.

As such, the output surface has an uneven portion in the form of a prism that reduces reflection to allow light having an appropriate distribution to be emanated highly efficiently. Thus, there can be implemented a backlight at low cost that is highly efficient and provides a spatially uniform distribution and an appropriate light distribution.

Desirably in the present backlight the uneven portion in the form of a prism has an unevenness having a ridge and a trough adjacent thereto with a difference therebetween in level randomly varying as seen in a direction from the bottom surface toward the output plane.

Thus Moire fringes of the uneven portion in the form of a prism and a pixel of a liquid crystal panel can be prevented to implement a backlight at low cost that provides high visibility and appropriate light distribution.

Desirably in the present backlight the dividing flat portion has a width randomly varying depending on a distance thereof from the receiving end surface.

A dividing flat portion also randomly varying in width can prevent Moire fringes between a reflecting hollowed portion in the form of a wedge and a pixel of a liquid crystal panel. Thus, there can be implemented a backlight at low cost that provides high visibility and appropriate light distribution.

Desirably in the present backlight the dividing flat portion in the form of a strip is curved in arrangement.

A dividing flat portion in the form of a strip that is curved in arrangement can prevent Moire fringes between a reflecting hollowed portion in the form of a wedge and a pixel of a liquid crystal panel. Thus, there can be implemented a backlight at low cost that provides high visibility and appropriate light distribution.

Desirably in the present backlight the reflecting hollowed portion in the form of a wedge has an oblique surface closer to the receiving end surface and having an angle periodically altered.

An oblique surface having an angle varying periodically as described above allows emanating light to have a wide angle of emanation in a direction perpendicular to the receiving end surface to provide the emanating light having a flat light distribution. Thus there can be provided a backlight at low cost that provides high visibility and appropriate light distribution.

Desirably in the present backlight the reflecting hollowed portion in the form of a wedge has an oblique surface closer to the receiving end surface and extending in a direction along the receiving end surface, in a form of a portion of a circumference of a cylinder concave to distant from the receiving end surface.

The oblique surface corresponding to a cylindrical surface that is concaved to be farther away from the receiving end surface, allows emanating light to have a wide angle of emanation in a direction perpendicular to the receiving end surface to provide the emanating light having a flat light distribution. Thus, there can be implemented a backlight at low cost that provides high visibility and appropriate light distribution.

Furthermore, desirably the present backlight further includes a scattering plate adjacent to the output surface to scatter a component of light traveling in a direction along the receiving end surface.

With a reflecting surface arranged as above, light reflected by a prism structure of the output surface is reflected while its angle in a direction perpendicular to the receiving end surface is maintained. As such, light in appropriate light distribution is emanated highly efficiently. Thus, there can be provided a backlight at low cost that is highly efficient and also provides appropriate light distribution.

Furthermore, desirably the present backlight further includes a scattering plate adjacent to the output surface to scatter a component of light traveling in a direction in a surface orthogonal to a direction along the receiving end surface.

The above scattering plate thus arranged allows emanating light to have a flat light distribution in a direction perpendicular to the receiving end surface. As such, there can be provided a backlight at low cost that provides high visibility and appropriate light distribution.

Furthermore, desirably the present backlight further includes an optical element provided between the light source and the receiving end surface and having an uneven structure in a form of a prism with a convexity arranged closer to the receiving end surface.

The above optical element arranged as above allows a reflecting surface of the form of a hollowed wedge to emanate light having more appropriate light distribution. Thus, there can be provided a backlight at low cost that provides appropriate light distribution.

Desirably in the present backlight the light guide plate is divided into portions in a direction perpendicular to the receiving end surface corresponding to a direction in which light propagates through the light guide plate, the portions being coupled together.

Dividing a light guide plate, as described above, eliminates the necessity of processing the light guide plate to have a single large area when it is manufactured. As such, it can be readily manufactured. Thus, there can be provided a backlight at low cost that provides spatially uniform distribution and appropriate light distribution.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIGS. 2A and 2B show a structure of a light guide plate, wherein FIG. 2A is a bottom view showing a distribution of a hollowed portion in the form of a wedge and a dividing flat portion that are provided in the light guide plate and FIG. 2B is a front view thereof as seen in a direction along its receiving end surface;

FIGS. 3A and 3B plot a result of simulating an angular distribution of incident light in a light guide plate in a vicinity of its receiving end surface, wherein FIG. 3A represents the angular distribution of the incident light in each of a vertical plane of the CCFL and a horizontal plane of the CCFL, and FIG. 3B shows how an angle is taken in the vertical plane of the CCFL;

FIG. 6B represents an angular distribution of light emanating from the output surface as seen in the horizontal and vertical planes of the CCFL;

FIG. 8 represents an angular distribution of a transmittance in each of a direction parallel to a hollowed portion (with a 0° C. angle perpendicular to the hollowed portion) and a direction perpendicular to the hollowed portion (with a 0° angle parallel to the hollowed portion) in FIG. 7;

FIG. 10 represents an angular distribution of a transmittance in each of a direction parallel to a hollowed portion (with a 0° angle perpendicular to the hollowed portion) and a direction perpendicular to the hollowed portion (with a 0° angle parallel to the hollowed portion) in FIG. 9;

DESCRIPTION OF THE PREFERRED EMBODIMENTS

The embodiments of the present invention will now be described with reference to the drawings.

First Embodiment

Figure 1:
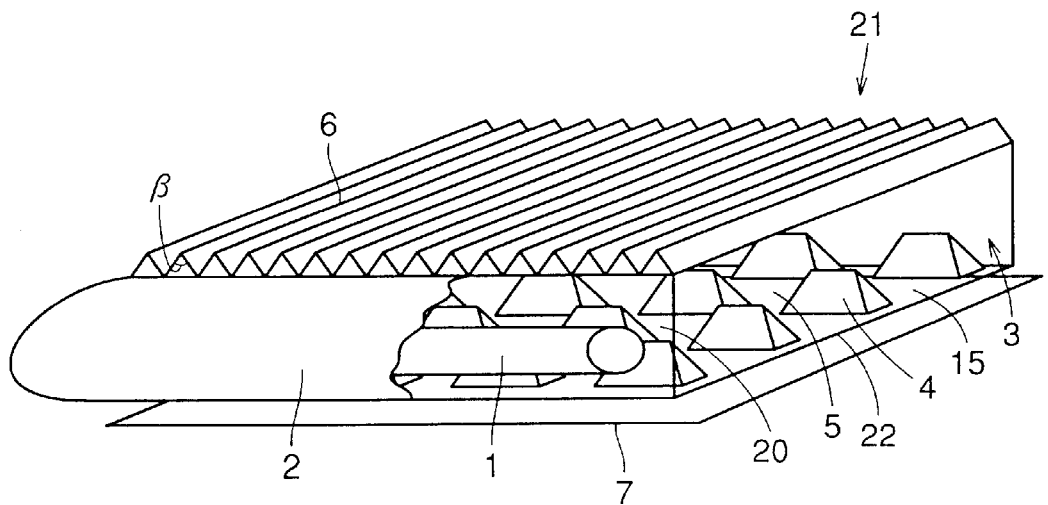
FIG. 1 is a partially seen-through, perspective view of a backlight in a first embodiment of the present invention.
Figure 2A:
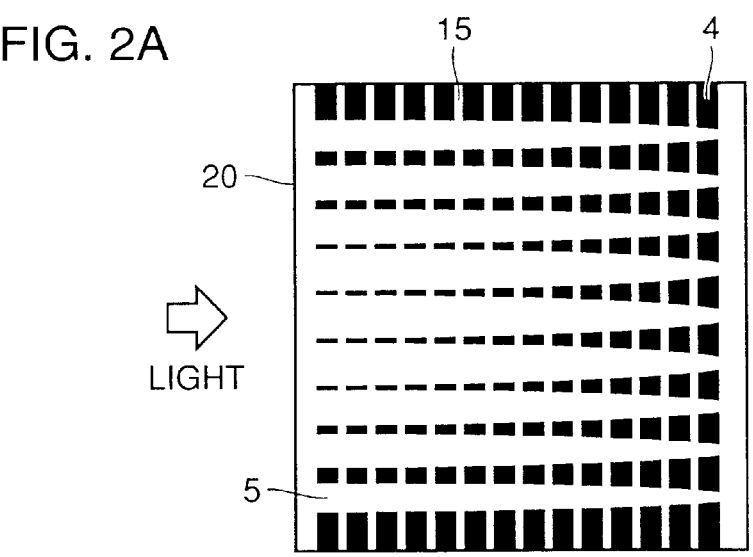
Figure 2B:
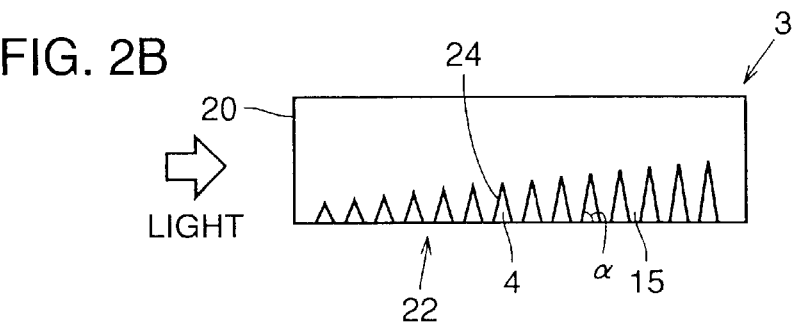

With reference to FIGS. 1 and 2A and 2B, a backlight includes a cold cathode fluorescent lamp (CCFL) 1 serving as a light source, a reflecting mirror 2 and a light guide plate 3. At the bottom plane there is provided a reflecting hollowed portion in the form of a wedge 4, provided in a reflecting prism, with a receiving oblique surface having an inclination $\alpha$ of 45° and emanating oblique surface having an inclination of 85°. Furthermore, reflecting hollowed portions 4 are spaced by a pitch of 200 $\mu$m and have a minimal depth of 50 $\mu$m and a maximal depth of 160 $\mu$m, increasing in depth as they are farther away from the light source. Herein, "depth" refers to a distance as measured from bottom surface 22 to the top edge of the reflecting hollowed portion in the form of a wedge, as seen in the vertical direction in the figure. Light guide plate 3 includes in a bottom surface 22 a dividing flat portion 5 in the form of a strip and a flat portion 15 located between hollowed portions. Dividing flat portions 5 is orthogonal to a direction in which the reflecting hollowed portion extends, to divide the reflecting hollowed portion. Flat portion 15 is provided between the reflecting hollowed portions in the form of wedges. Light guide plate 3 also includes a reflecting bottom plate 7 adjacent to bottom surface 22. Furthermore, the light guide plate has an output surface 21 corresponding to its top surface and having an uneven portion 6 in the form of a prism with a convexity having an apex angle $\beta$ of 100° grooves spaced by a pitch of 180 $\mu$m.

CCFL 1 emits light which proceeds directly to a receiving end surface 20 of light guide plate 3 or is reflected by reflecting mirror 2 and thus incident of receiving end surface 20 and repeats total reflection on bottom surface 22 and output surface 21 as it propagates. When reflecting hollowed portion in the form of a wedge 4 receives light on its receiving oblique surface 24 it reflects the light upward. Since reflecting hollowed portion in the form of a wedge 4 is partially divided by a dividing flat portions 5 in the form of a strip, the light traveling past dividing flat portions 5 can propagates through light guide plate 3 as it is, to control a spatial distribution of an amount of emanating light. The light reflected on the reflecting surface does not have the conditions for total reflection and thus emanates through output surface 21, which, having uneven portion in the form of a prism 6, provides a narrow distribution of light.

Figure 3A:
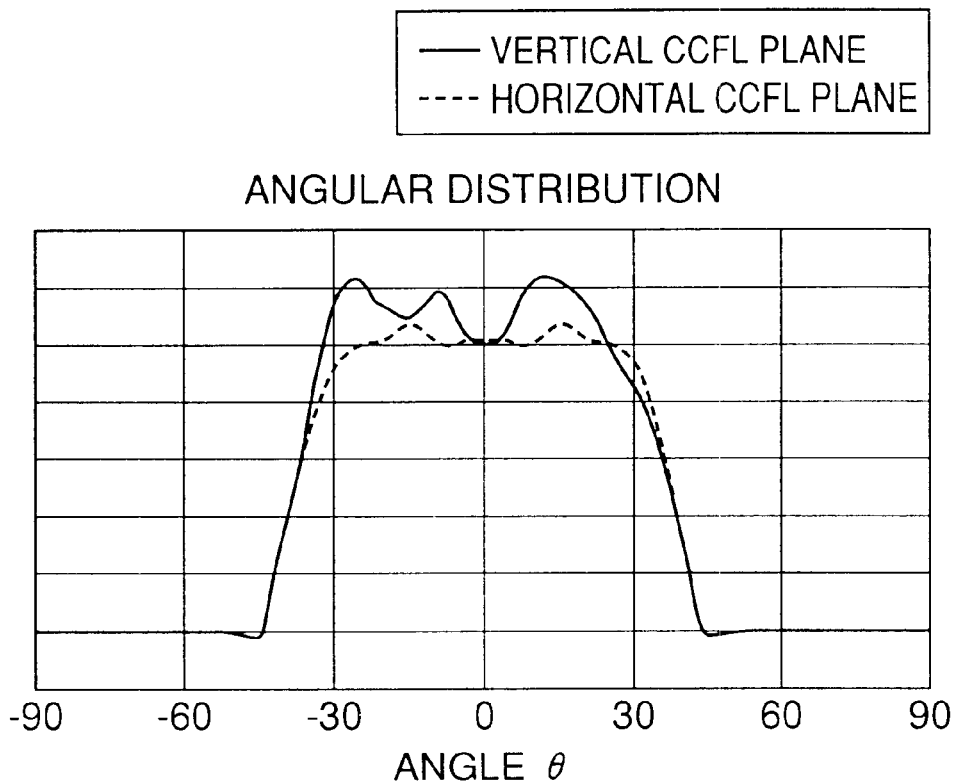
Figure 3B:
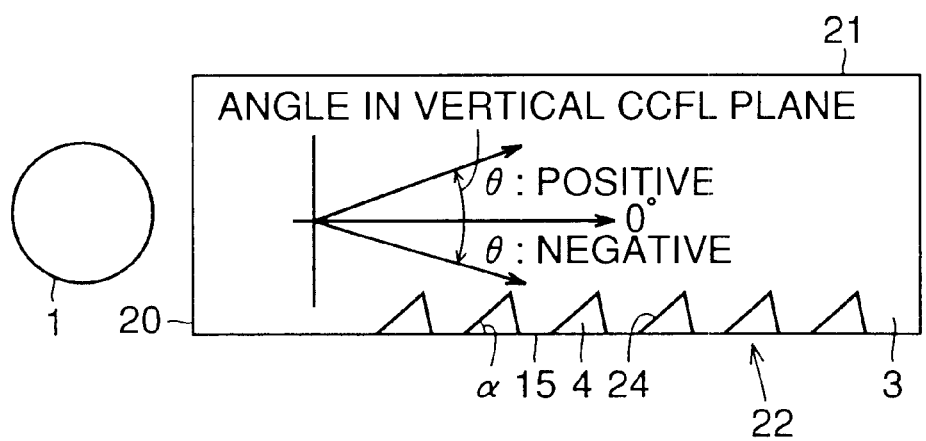

FIGS. 3A and 3B represent an exemplary result of simulating an angular distribution of light emitted by CCFL 1 and propagating through a light guide plate immediately after the light is incident on the light guide plate. For both of each direction in a horizontal CCFL plane including the axis of CCFL 1 and the surface of the light guide plate and each direction in a vertical CCFL plane orthogonal to the axis of CCFL 1, there is provided a distribution symmetrical with respect to 0°, a direction proceeding straight through the light guide plate along the light guide plate. For both of an angle in the horizontal CCFL plane and that in the vertical CCFL plane, the origin 0° has a direction proceeding straight through the light guide plate along the light guide plate and it is a common angle. If such light is reflected by a reflecting hollowed portion in the form of a wedge, arranged on bottom surface 22 of the light guide plate, the reflecting hollowed portion mostly reflects light having an angle no more than 0° as seen in the vertical CCFL plane, as shown in FIG. 3B. Light failing to have such angle is reflected on top surface 21 of the light guide plate and after it has an angle no more than 0° it reaches reflecting hollowed portion in the form of a wedge 4.

Figure 4:
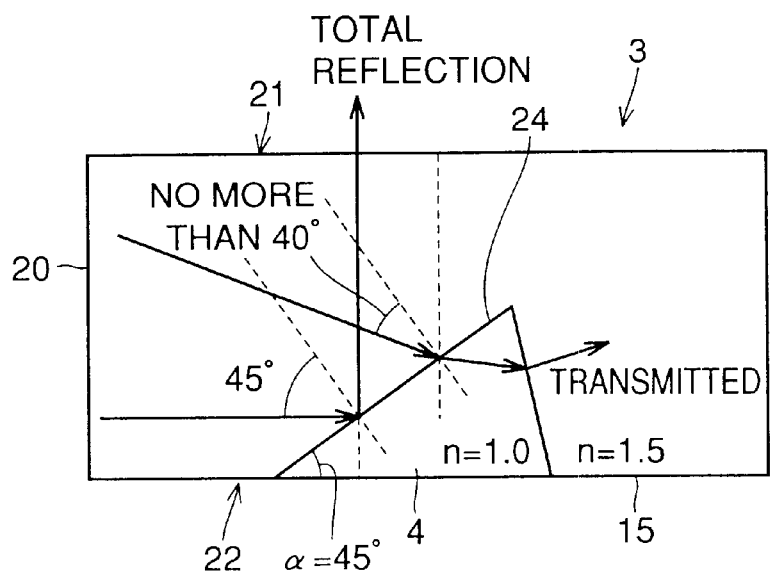
FIG. 4 shows an effect of the reflecting hollowed portion in the form of a wedge in the first embodiment.

Furthermore, as shown in FIG. 4, reflecting hollowed portion in the form of a wedge 4 reflects only light incident on the reflecting hollowed portion at an angle of incidence satisfying the conditions for total reflection. Light failing to have such angle is mostly transmitted through the reflecting hollowed portion and continues to propagate through the light guide plate. If a reflecting hollowed portion in the form of a wedge has a receiving oblique surface having angle $\alpha$ of 45°, with the light guide plate typically formed of a material having an index of refraction of approximately 1.5, total reflection is not achieved for light incident at an angle of incidence no more than approximately 40° to a line perpendicular to the receiving oblique surface of the reflecting hollowed portion. As shown in FIG. 4, of light incident on an oblique surface having an inclination $\alpha$ of 45° and traveling through the light guide plate at an angle no more than 0°, only light having an angle in a range of 0° to −5° is reflected and emanates from light guide plate 3 substantially vertically. Thus, the light extracted from the light guide plate via reflecting hollowed portion in the form of a wedge 4 has an angular distribution, as seen in the vertical CCFL plane, that has a light distribution characteristic having a high intensity only in a direction in which the light is visually recognized.

Figure 5:
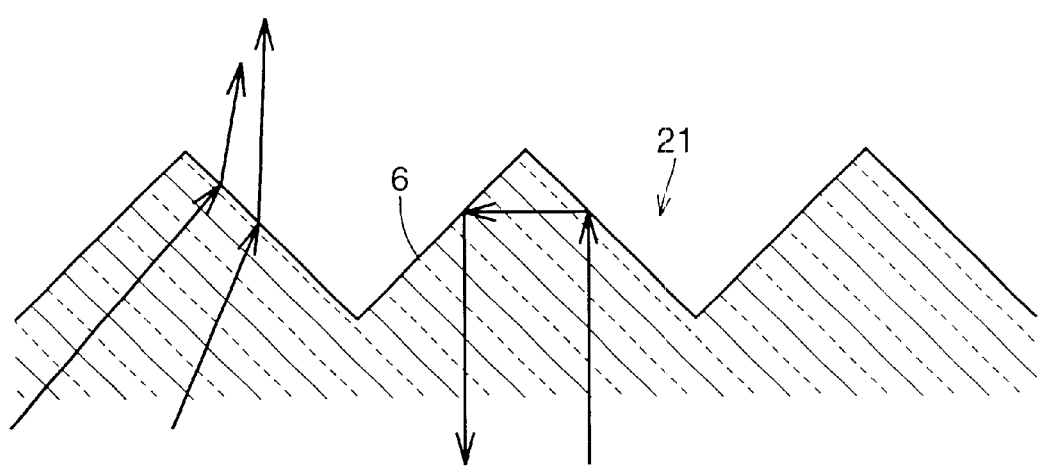
FIG. 5 shows an effect of an uneven portion in the form of a prism in the first embodiment.

Furthermore, as shown in FIG. 5, emanating light in a range as seen in a direction parallel to the CCFL is refracted substantially perpendicular to the output surface by an uneven portion in the form of a prism 6 serving as a collecting prism provided in output surface 21 to allow the emanating light to have a direction, and it is thus collected. In contrast, emanating light substantially perpendicular to the output surface is reflected in total reflection into the light guide plate again and thus recycled. Thus, also in a plane parallel to the CCFL light has an angular distribution having a light distribution characteristic to collect light in a direction perpendicular to the output surface. Thus, a light guide plate having arranged therein uneven portion in the form of a prism 6 and reflecting hollowed portion in the form of a wedge 4, can effectively emanate light having a light distribution appropriate to be visually recognized that is collected in a direction perpendicular to the output surface, without requiring another optical element such as a prism sheet.

Figure 6A:
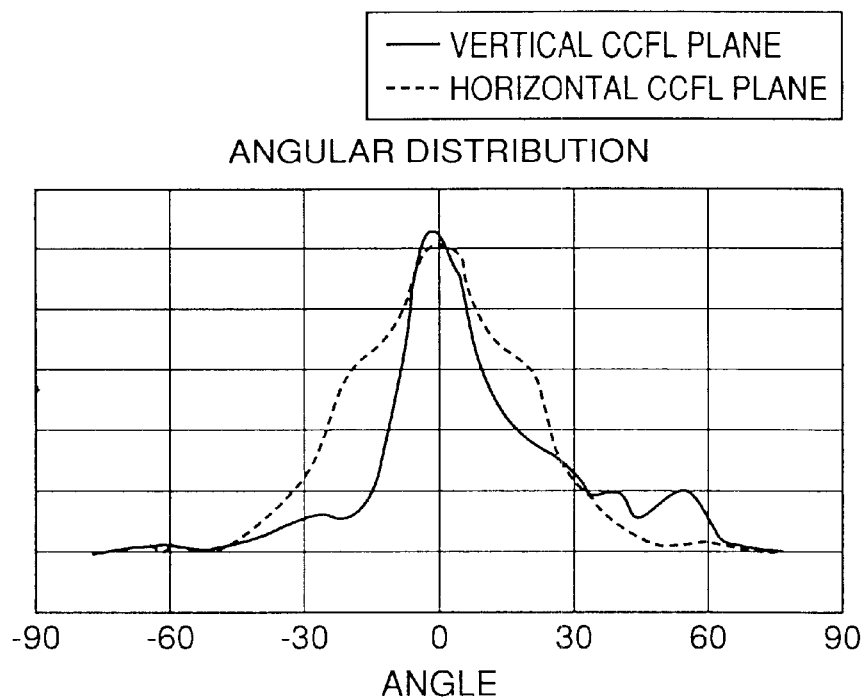
FIGS. 6A and 6B represent a characteristic of a distribution of light emanating from the backlight in the first embodiment of the present invention, wherein FIG. 6A represent those in the horizontal and vertical planes of the CCFL and that in a 0° direction common to the both planes
Figure 6B:
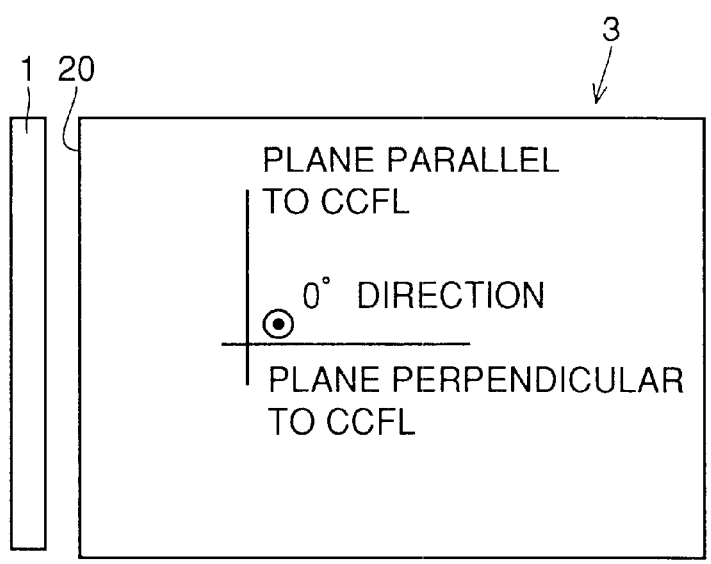

FIGS. 6A and 6B represent a result of simulating an angular distribution of light emanating from this light guide plate. FIG. 6A represents an angular distribution in intensity of light and FIG. 6B is a schematic view showing how an angle is taken. For the both of a direction in a horizontal CCFL plane including the axis of CCFL 1 and being orthogonal to the light guide plate and a direction in a vertical CCFL plane orthogonal to the CCFL axis, intensity peaks in a direction perpendicular to the output surface or 0°, i.e., a direction in which light is visually recognized. In particular, as in effect of the uneven portion in the form of a prism, light in the vertical CCFL plane has a sharp peak at 0°. Note that in both of a direction in the horizontal CCFL plane and that in the vertical CCFL plane the origin 0° corresponds to a direction perpendicular to output surface 21.

Herein to uniformly extract light from the entire surface of the light guide plate the probability with which light is incident on reflecting surface 24 of reflecting hollowed portion 4 is required to be changed to consider different locations in the light guide plate. For the backlight of the present embodiment, as shown in FIG. 2B, reflecting hollowed portion in the form of a wedge 4 has different depths and dividing flat portion 5 in the form of a strip dividing the reflecting hollowed portion also has different widths to alter the probability at which light is incident on reflecting hollowed portion 4 at reflecting surface 24, to allow light to have a spatial uniformity. If only one of them is altered, reflecting hollowed portion in the form of a wedge 4 may be required to be as extremely shallow as several μm or have a shape with an extremely high aspect ratio. As a result, the hollowed portion in the form of a wedge needs to be processed with high precision, which can increase the cost for manufacturing the backlight.

Figure 7:
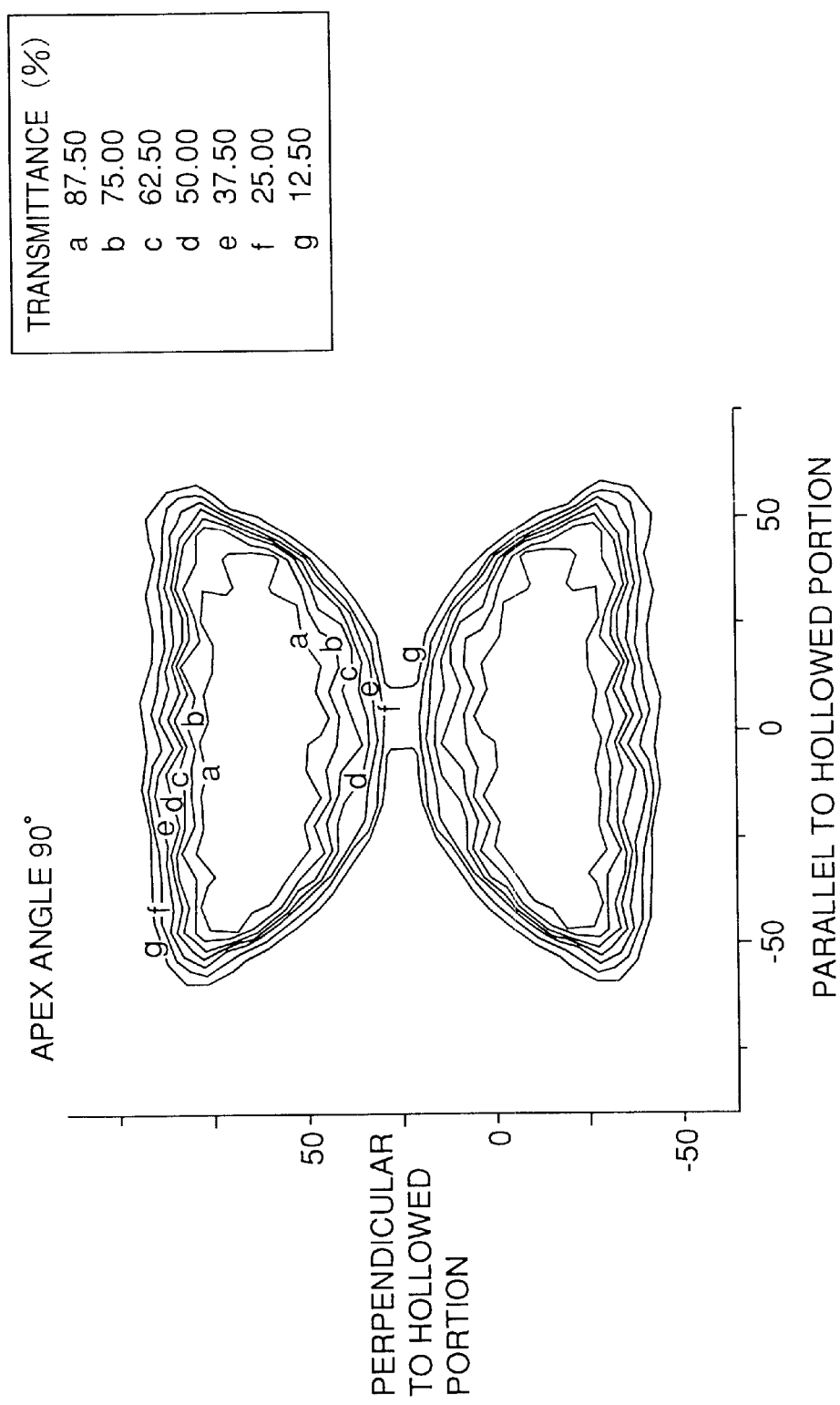
FIG. 7 is a diagram displaying angular distribution of a transmittance of the uneven portion in the form of a prism (with an apex angle of 90°) of the backlight in the first embodiment.
Figure 9:
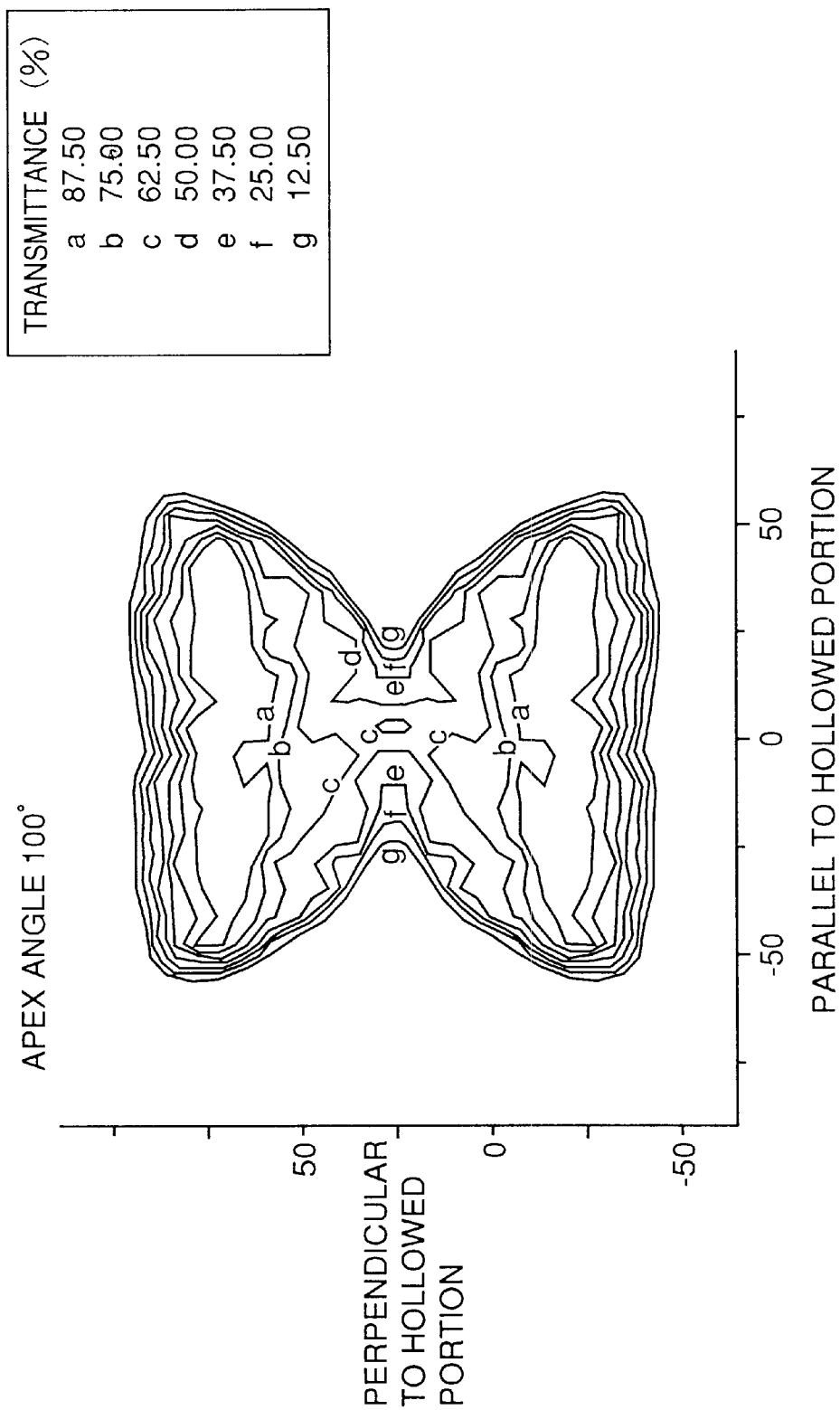
FIG. 9 is a view displaying an angular distribution of a transmittance of an uneven portion in the form of a prism (with an apex angle of 100°) of the backlight in the first embodiment.

FIGS. 7 to 10 represent a distribution of an angle of incidence in transmittance of light emanating internal to light guide plate 3 and incident on uneven portion in the form of a prism 6 provided in top surface 21 of the light guide plate. If the prism has an apex angle β of 90°, as shown in FIGS. 7 and 8, then for an angle of incidence which is parallel to a direction in which uneven portion 6 in the form of a prism extends and which is in a plane perpendicular to the output surface, light is transmitted with a maximal transmittance of approximately 20% only when it is incident thereon substantially perpendicularly. In contrast, if the prism has an apex angle β of 100°, as shown in FIGS. 9 to 10, in the plane as described above a maximal transmittance exceeding 60% is obtained, revealing that large apex angle β provides high transmittance.

Light having failed to pass through the uneven portion in the form of a prism is reflected on a plane of the uneven portion and also altered in direction for example by reflecting bottom plate 7 and again directed to top surface 21. Thus, substantially all light ultimately emanates, while the light, however, also lose an appropriate distribution obtained via reflecting hollowed portion in the form of a wedge 4. Accordingly, to efficiently obtain light having appropriate distribution, uneven portion in the form of a prism 6 is required to reflect light in as small an amount as possible. Reducing apex angle β of uneven portion in the form of a prism 6 would result in a reduced range for transmission for an angle of incidence having a direction parallel to the uneven portion in the form of a prism, as has been described previously, and for an angle less than 100° there would be almost no range of angle of incidence for transmission. As such, with apex angle β no less than 100°, reflecting hollowed portion in the form of a wedge 4 is required to direct, to the top surface, substantially perpendicular light matching a range of an angle of incidence allowing light to be transmitted. The reflecting hollowed portion in the form of a wedge appropriately has oblique surface 24 having an inclination a in a range from 40° to 50°.

Second Embodiment

Figure 11:
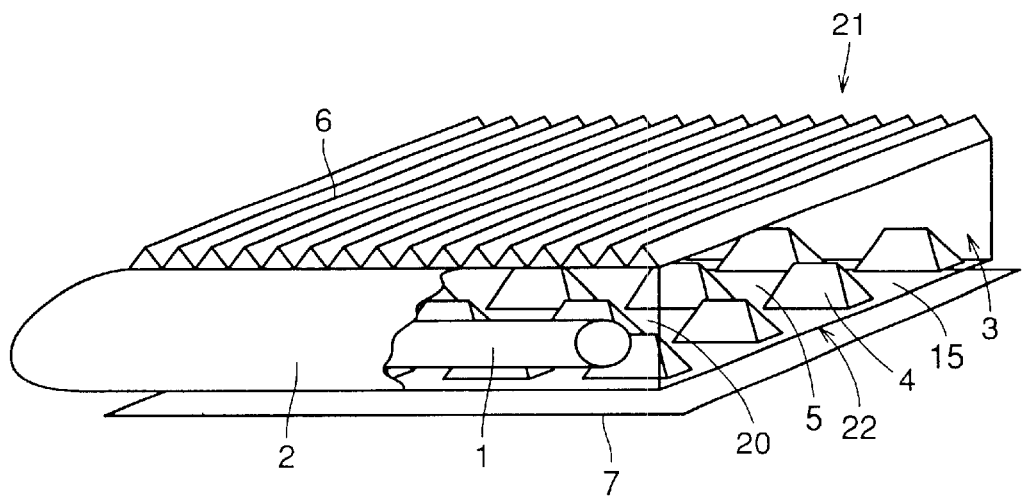
FIG. 11 is a schematic view of a structure of a backlight in a second embodiment of the present invention.
Figure 12A:
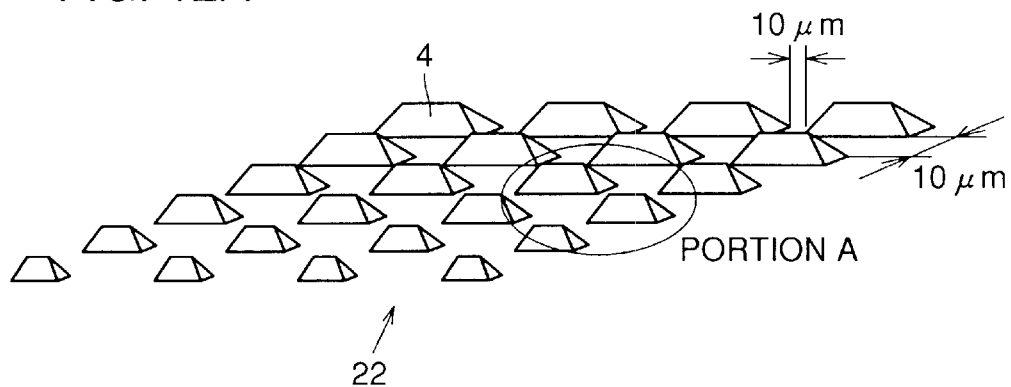
FIG. 12A shows a reflecting hollowed portion in the form of a wedge, a dividing flat portion and a flat portion between reflecting hollowed portions in a vicinity of the bottom surface.
Figure 12B:
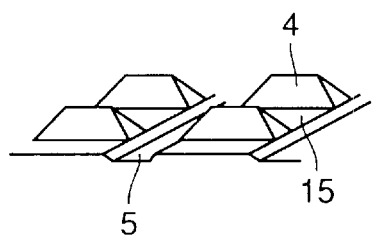
FIG. 12B shows in detail a relationship in depth between a flat portion in the form of a strip and a flat portion between reflecting hollowed portions as shown in FIG. 12A.

FIGS. 11–12 show a backlight for a liquid crystal display device in a second embodiment of the present invention. FIG. 11 is a perspective view of the backlight, and FIG. 12A is a perspective view of a reflecting hollowed portion in the form of a wedge and FIG. 12B is an enlarged view of the portion A. In the present embodiment, even dividing flat portion in the form of a strip 5 that is the most distant from light source 1 of light guide plate 3 has a smallest width of at least 10 μm. Furthermore, flat portion 15 between reflecting hollowed portions 4 has a width of at least 10 μm. Furthermore, the flat portion between reflecting hollowed portions is positioned deeper upward than the dividing flat portion, as measured with reference to bottom surface 22, i.e., closer to top surface 21 than the dividing flat portion for the reason as will be described in detail hereinafter with reference to FIGS. 13A and 13B, and 14A and 14B.

The remainder is basically similar in configuration to the first embodiment and the backlight includes a CCFL 1 serving as a light source, a reflecting mirror 2, a light guide plate 3 and a reflecting back plate 7. Light guide plate 3 includes a reflecting hollowed portion in the form of a wedge 4, a flat portion in the form of a strip 5 provided to divide the reflecting hollowed portion, and an uneven portion in the form of a prism 6. As well as in the first embodiment, the reflecting hollowed portion in the form of a wedge and the uneven portion in the form of a prism can act to emanate light from the light guide plate with an appropriate light distribution characteristic.

If a light guide plate having a reflecting hollowed portion in the form of a wedge, such as light guide plate 3 of the present invention, is massproduced, a die is often used to injection-mold the same. In producing the molding die, as shown in FIGS. 13A and 13B and FIGS. 14A and 14B, a threading tool of diamond 31, 32 can be used to cut NiP or a similar material to process a die for reflecting hollowed portion in the form of a wedge 4 and uneven portion in the form of a prism 6. In doing so, threading diamond tool 31, 32 appropriately shaped can accurately process for example an oblique surface of a reflecting hollowed portion in the form of a wedge. The flat portion between reflecting hollowed portions is formed with a threading diamond tool having a tip flat to some extent. A pitch of no more than the width of the tool's flat tip is applied to repeatedly cut the material of interest to form a flat portion between reflecting hollowed portions. For example, flat portion 15 between reflecting hallowed portions has a width that varies depending on the position thereof in the light guide plate to emanate light having a spatially uniform distribution in intensity. A flat portion cannot be processed to have a width no more than the flat tip of the threading diamond tool. Accordingly, the tool is required to have a flat tip having a width smaller than the narrowest flat portion. If a threading diamond tool is produced to provide a flat portion having too small a width, however, it cannot readily be produced, for example having an inaccurately formed flat tip. As a result, in processing a die to provide a flat portion, fine convexities and concavities would disadvantageously result, which would in turn cause light to scatter. Flat portion 15 between hollowed portions and flat portion 5 in the form of a strip having a width of at least 10 µm allow a threading diamond tool to be readily produced. Consequently, a die can be processed accurately at low cost.

Figure 13A:
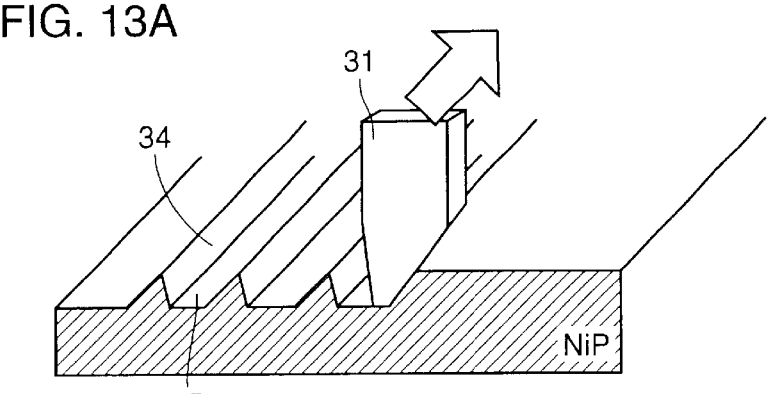
FIG. 13A shows a method of processing a die for the light guide plate to provide a flat portion between hollowed portions.
Figure 13B:
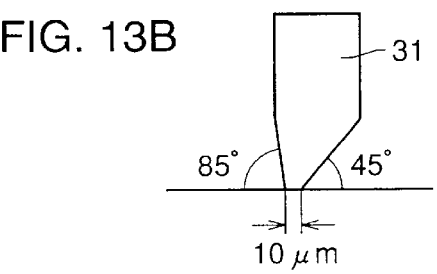
FIG. 13B is a front view of a threading tool for use in processing a reflecting hollowed portion in the form of a wedge.
Figure 14A:
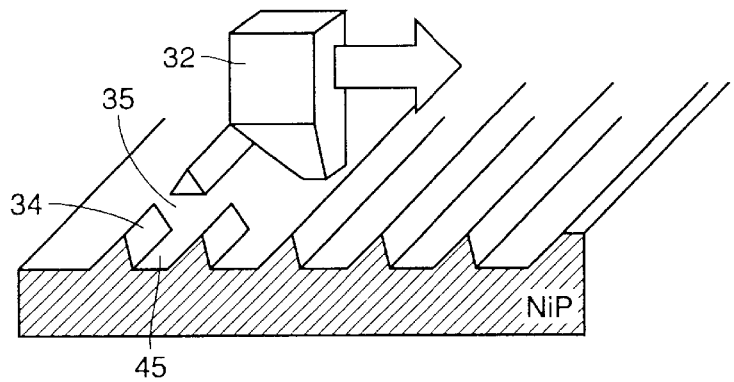
FIG. 14A shows a method of processing a die for a light guide plate to provide a dividing flat portion.
Figure 14B:
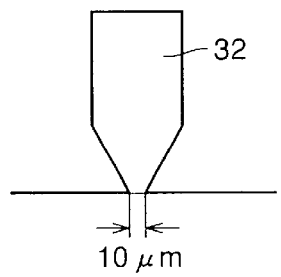
FIG. 14B is a front view of a threading tool for use in processing a dividing flat portion.

With reference to FIGS. 13A and 13B and FIGS. 14A and 14B, a die is processed to provide a wedging portion 34 corresponding to a reflecting hollowed portion in the form of a wedge and a flat portion in the form of a strip 35 dividing wedging portion 34, as will now be described. For example, as shown in FIG. 13B, a threading tool 31 having oblique surfaces of 45° and 85° and a flat tip of 10 µm is used to cut the die to provide wedging portion 34 and flat portion 45 between wedging portions as it scans the die. Then, a threading tool 32 is used to process the die to provide dividing flat portion in the form of a strip 35. Threading tool 32 is moved in a direction orthogonal to the processing direction or the direction in which wedging portion 34 extends, to process the die to provide dividing flat portion 35, as shown in FIGS. 14A and 14B. Herein, wedging portion 34 is processed with a threading diamond tool in a direction and dividing flat portions 35 is processed with a different threading diamond tool in a different direction. As such, it is difficult to accurately position them and flat portion 45 between wedging portions and dividing flat portion in the form of a strip 35 may not be provided in a single plane and a step can thus result. Even the smallest step causes light to leak or be reflected therefrom to adversely affect a light emanation characteristic of the light guide plate.

Figure 15:
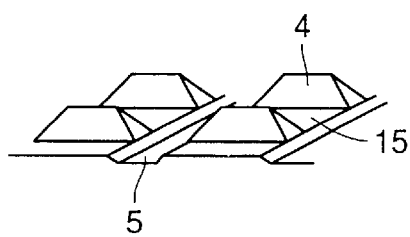
FIG. 15 shows a structure of a bottom surface of a light guide plate in a direction of a depth thereof when a flat portion between hollowed portions is shallower than a flat portion in the form of a strip.
Figure 16:
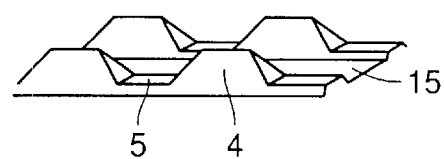
FIG. 16 shows a structure of a bottom surface of a light guide plate in a direction of a depth thereof when a flat portion between hollowed portions is deeper than a flat portion in the form of a strip.

If a die is processed to provide a deeper dividing flat portion 5 and a light guide plate actually provided thus has a shallower dividing flat portion 5, a step extends perpendicular to receiving end surface 20 of the light guide plate, as shown in FIG. 15. In contrast, if a die is processed to provide a deeper flat portion 15 provided between reflecting hollowed portions and a light guide plate actually provided thus has a shallower flat portion between the hollowed portions, a step extends parallel to receiving end surface 20 of the light guide plate, as shown in FIG. 16. Since light propagates through a light guide plate in a direction generally perpendicular to the receiving end surface of the light guide plate, the step's effect would be reduced if a die is processed to provide a deeper dividing flat portion 5 to allow the step to extend in a direction perpendicular to receiving end surface 20. As such, a light guide plate shaped to have flat portion 15 between hollowed portions that is positioned deeper than dividing flat portion 5 can reduce the negative effects of the step and a die can be processed readily with low precision to provide a light guide plate with good characteristics.

Third Embodiment

Figure 17:
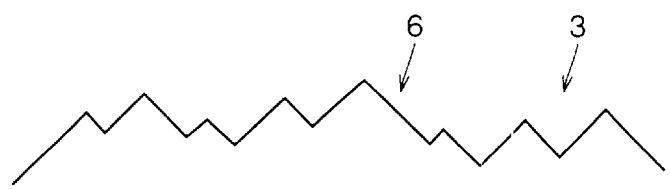
FIG. 17 is a cross section of an uneven portion in the form of a prism having a random depth in a backlight in a third embodiment of the present invention.
Figure 18:
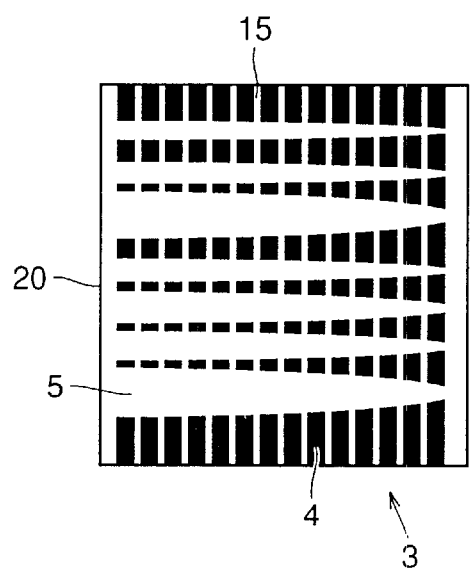
FIG. 18 is a bottom view of a reflecting hollowed portion in the form of a wedge in the third embodiment.

In the present embodiment, a backlight for a liquid crystal display device, as shown in FIGS. 17 to 18, includes uneven portion in the form of a prism 6 having a ridge and a trough adjacent thereto with a difference therebetween in thickness that randomly varies as seen from the bottom surface (hereinafter referred to as a "depth of the uneven portion in the form of a prism") and also randomly spaced from each other in the horizontal direction, and dividing flat portion 5 randomly spaced in arrangement. The remainder is basically similar in configuration to the first embodiment (FIG. 1), including CCFL 1 serving as a light source, reflecting mirror 2, light guide plate 3 and reflecting back plate 7. As well as the first embodiment, the present embodiment can also provide a light guide plate provided with reflecting hollowed portion in the form of a wedge 4 and uneven portion in the form of a prism 6 allowing light to be emanated from the light guide plate with an appropriate light distribution characteristic.

A liquid crystal panel has periodically arranged pixels of approximately 100 µm in size. As such, if a backlight includes uneven portion in the form of a prism 6 and reflecting hollowed portion in the form of a wedge 4 having a periodical structure then it would emanate light having a periodical distribution and therebetween there would be produced Moire fringes, resulting in a degraded visibility. Uneven portion in the form of a prism 6 having a random depth and spaced randomly and dividing flat portion 5 for example spaced randomly or curved in arrangement, as shown in FIGS. 17 and 18, can prevent Moire fringes and hence degraded visibility.

Figure 19:
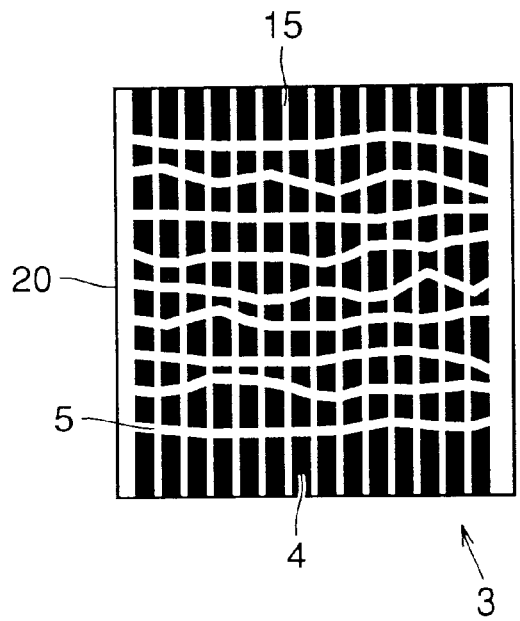
FIG. 19 is a bottom view of another reflecting hollowed portion in the form of a wedge in the third embodiment.
Figure 20:
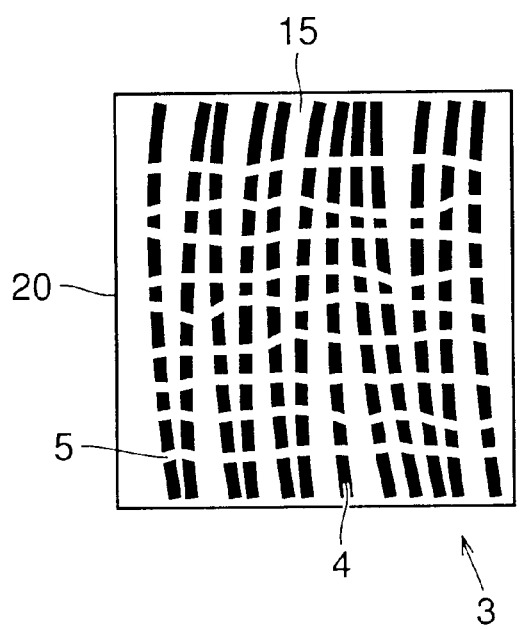
FIG. 20 is a bottom view of a still another reflecting hollowed portion in the form of a wedge in the third embodiment.

Furthermore, to prevent a reflecting hollowed portion in the form of a wedge and a liquid crystal panel from having Moire fringes therebetween, dividing flat portion in the form of a strip 5 can be arranged at a random and also curved pitch, as shown in FIG. 19, to prevent the same from having a periodical structure causing Moire fringes. Furthermore, as shown in FIG. 20, reflecting hollowed portion in the form of a wedge 4 can be randomly spaced, flat portion 15 between hollowed portions can have a random width and dividing flat portion in the form of a strip 5 can be curved to remove Moire fringes. It should be noted that the dividing flat portion can also have a random width to eliminate Moire fringes.

Fourth Embodiment

Figure 21A:
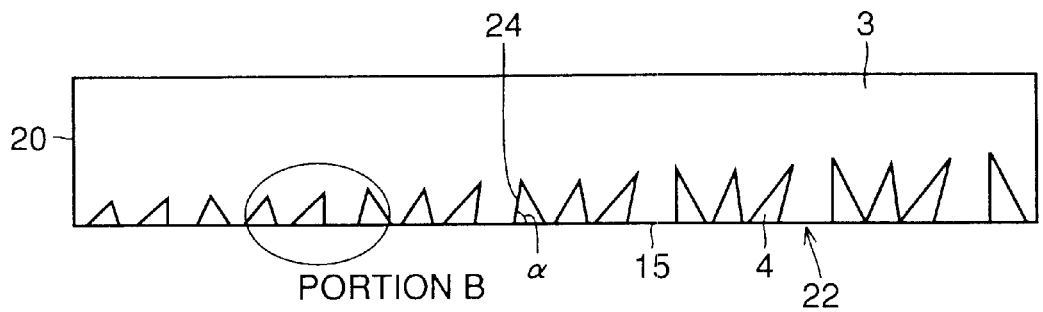
FIG. 21A is a schematic cross section of a structure of a backlight in a fourth embodiment of the present invention.
Figure 21B:
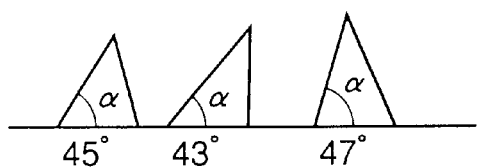
FIG. 21B is an enlarged cross section of three reflecting hollowed portions in the form of three wedges in succession, as shown in FIG. 21A.
Figure 22:
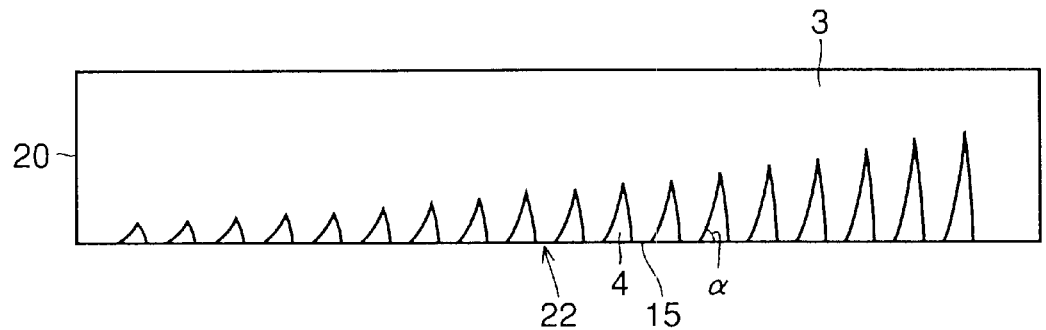
FIG. 22 is a schematic cross section of a structure of another backlight in the fourth embodiment.

FIGS. 21A and 21B show a backlight for a liquid crystal display device in a fourth embodiment of the present invention. In the present embodiment, three successive reflecting hollowed portions in the form of wedges have their respective receiving oblique surfaces 24 having inclinations α for example of 43°, 45° and 48°, respectively, and such three successive reflecting hollowed portions are seen as one period also varying periodically, as shown in FIGS. 21A and 21B. The remainder of the backlight is basically similar in configuration to the first embodiment. As such, as well as the first embodiment, the present invention can also provide a reflecting hollowed portion in the form of a wedge and an uneven portion in the form of a prism allowing light to be emanated from a light guide plate with an appropriate light distribution characteristic.

If a reflecting hollowed portion in the form of a wedge has a reflecting surface with an inclination of approximately 45°, then light reflected therefrom has a narrow angular distribution for a direction in the vertical CCFL surface, as has been described in the first embodiment with reference to FIG. 6A. If it matches a direction in which light is visually recognized then there can be obtained an extremely bright display. If it is offset from such direction, however, brightness would be significantly reduced. As such, for some liquid crystal display devices, a wide angular distribution can be desirable to obtain satisfactory brightness even if a direction in which light is visually recognized is slightly changed. If a reflecting hollowed portion in the form of a wedge has a receiving oblique surface with inclinations for example of 43°, 45° and 48°, respectively, as shown in FIG. 21B, and three such successive reflecting hollowed portions in the form of wedges are seen as one period varying periodically, then light emanating from each hollowed portion can overlap each other to provide a distribution of emanating light having at least a label of brightness over a wide angular range.

Furthermore, a reflecting hollowed portion in the form of a wedge having a receiving oblique surface concave to be distant from receiving end surface 20, in the form of a portion of the circumference of a cylinder, can be similarly effective.

Fifth Embodiment

Figure 23:
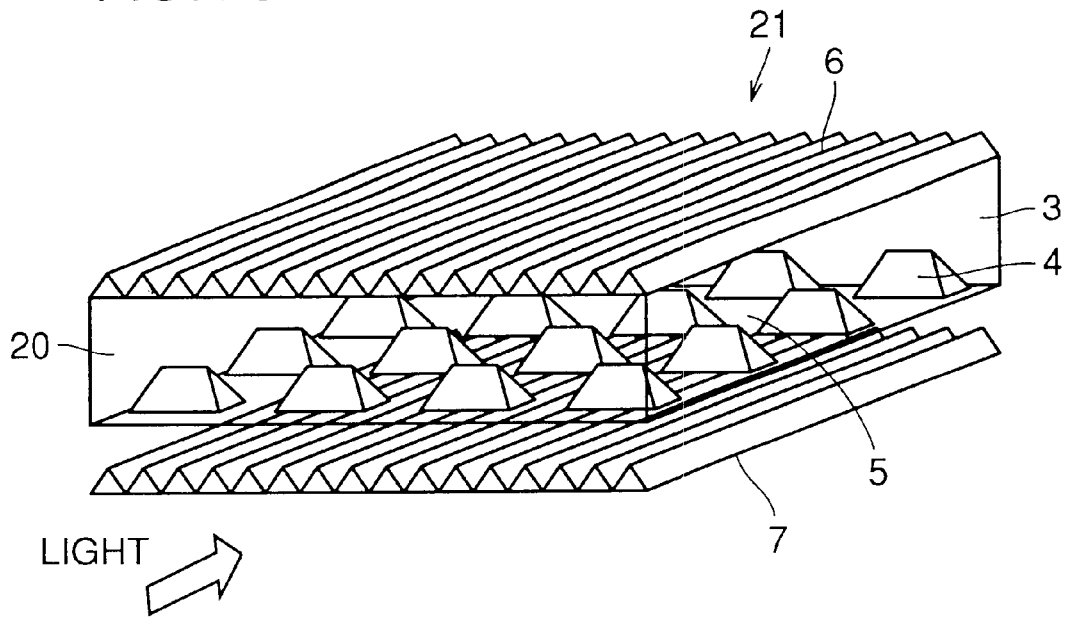
FIG. 23 is a perspective view of a structure of a backlight in a fifth embodiment of the present invention.

FIG. 23 is a perspective view of a backlight for a liquid crystal display device in a fifth embodiment of the present invention. The present embodiment is characterized in that reflecting back plate 7 is a reflecting surface having an uneven structure in the form of a prism extending in a direction perpendicular to receiving end surface 20 of the light guide plate. The remainder of the present backlight is basically similar in configuration to the first embodiment, including light guide plate 3, reflecting hollowed portion 4 in the form of a wedge, a dividing flat portion in the form of a prism 5 dividing the reflecting hollowed portion in the form of a wedge, and uneven portion in the form of a prism 6. As such, as well as the first embodiment, the present invention can also provide reflecting hollowed portion in the form of a wedge 4 and uneven portion in the form of a prism 6 allowing a light guide plate to emanate light with an appropriate light distribution characteristic.

Of light extracted from a light guide plate via a reflecting hollowed portion in the form of wedge, that in an angular range parallel to the CCFL axis is reflected back into the light guide plate by an optical element configuring an uneven portion in the form of a prism provided in output surface 21 of the light guide plate. The reflected light is reflected by reflecting back plate 7 of bottom surface 22 of the light guide plate, when its direction is changed from a direction parallel to the CCFL axis to a direction allowing the light to be transmitted through the uneven portion in the form of a prism and it thus again arrives at the output surface and thus emanates therefrom. Typically, reflecting back plate 7 is an isotropic scattering sheet to scatter light to change an angle of a direction in which light travels. If such isotropic scattering sheet is used, however, not only is light having a direction parallel to the CCFL changed but light having a direction in a plane orthogonal to the CCFL would have its direction changed when it is reflected by a reflecting hollowed portion in the form of wedge. This degrades a final light distribution characteristic of emanating light. In the present embodiment, reflecting back plate 7 can be a reflecting plate having an uneven portion in the form of a prism extending in a direction perpendicular to receiving end surface 20 of the light guide plate, to allow only light having a direction parallel to the CCFL axis to be altered in direction and thus reflected to allow a light distribution characteristic free of degradation. Such light distribution characteristic free of degradation can also be achieved by an anisotropic reflecting plate, a diffraction grating, a hologram or any other similar means instead of the above mentioned uneven portion in the form of a prism.

Sixth Embodiment

Figure 24:
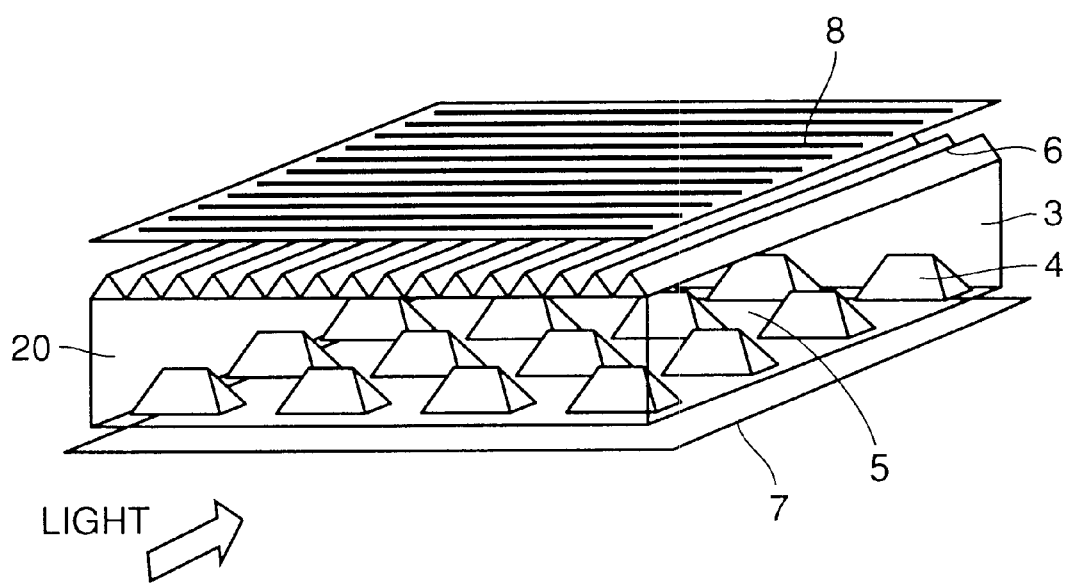
FIG. 24 is a perspective view of a structure of a backlight in a sixth embodiment of the present invention.

FIG. 24 shows a backlight for a liquid crystal display device in a sixth embodiment of the present invention. In the present embodiment, adjacent to the light guide plate's top surface 21 there is also arranged an anisotropic scattering plate 8 scattering and transmitting only light having a direction perpendicular to receiving end surface 20. The remainder of the backlight is basically similar in configuration to the first embodiment, including light guide plate 3, and reflecting back plate 7. The light guide plate is provided with reflecting hollowed portion in the form of a wedge 4, dividing flat portion in the form of a strip 5 dividing the reflecting hollowed portion in the form of a wedge, and an uneven portion in the form of a prism 6. As such, as well as the first embodiment, the present embodiment can also provide reflecting hollowed portion in the form of a wedge 4 and an uneven portion in the form of a prism 6 allowing a light guide plate to emanate light with an appropriate light distribution characteristic.

If a reflecting hollowed portion in the form of a wedge has a reflecting surface with an inclination of approximately 45°, then light reflected therefrom has a narrow angular distribution for a direction in the vertical CCFL plane, as has been described in the first embodiment. If it matches a direction in which light is visually recognized then there can be obtained an extremely bright display. If it is offset from such direction, however, brightness would be significantly reduced. As such, for some liquid crystal display devices, a wide angular distribution can be desirable to obtain satisfactory brightness even if a direction in which light is visually recognized is slightly changed. If an anisotropic scattering plate scattering and transmitting light having only each direction in the vertical CCFL plane is arranged adjacent to top surface 21 of the light guide plate, it does not affect a light distribution having a direction parallel to a direction in which receiving end surface 20 extends while it can widen a light distribution having a direction perpendicular to a direction in which receiving and top surface 21 extends, to provide a distribution of emanating light having at least a level of brightness over a wide range.

Note that an anisotropic scattering plate 8 can be replaced by a diffraction grating, a hologram, a lenticular lens plate, or the like.

Seventh Embodiment

Figure 25:
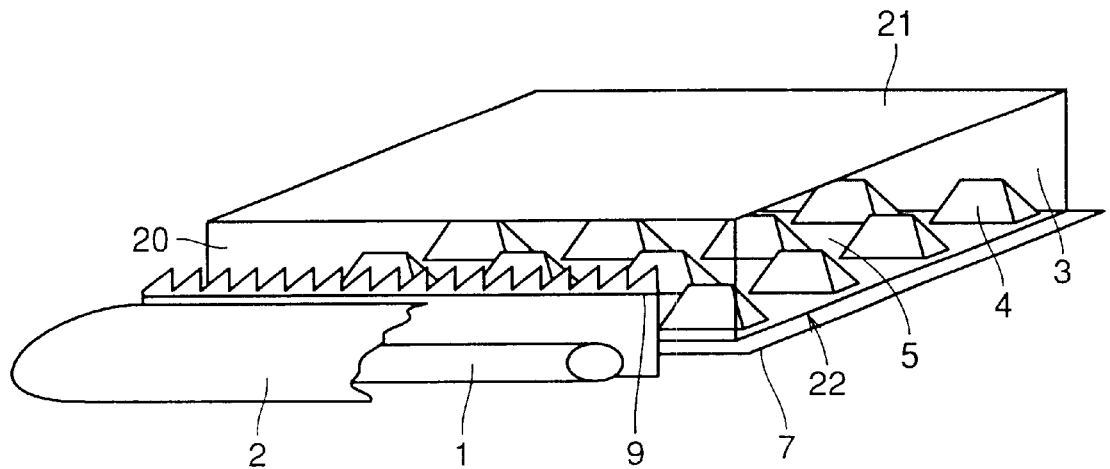
FIG. 25 is a perspective, partially seen-through view of a structure of a backlight in a seventh embodiment of the present invention.

FIG. 25 shows a backlight for a liquid crystal display device in a seventh embodiment of the present invention. The present embodiment is characterized in that an optical element 9 having an uneven structure in the form of a prism having an apex angle of 90° and a pitch of 180 μm, is arranged between the light source and the receiving end surface. Furthermore, reflecting hollowed portion 4 in the form of a wedge has a receiving oblique surface of 45° in inclination and an emanating oblique surface of 85° in inclination, with a pitch of 200 μm and a minimal depth of 50 μm and a maximal depth of 160 μm, deeper as it is more distant from the light source. As shown in FIG. 25, the backlight includes CCFL 1 serving as a light source, reflecting mirror 2, light guide plate 3 and reflecting back plate 7.

Light emanating from the light source is incident on optical element 9 having a gap in the form of a prism, directly or after it is reflected by reflecting mirror 2. The incident light is effectively collected by the prism structure and thus converted to have a narrow light distribution having a center in a direction perpendicular to the receiving end surface if the light widens over a range in a direction in the horizontal CCFL plane including the CCFL axis and the surface of the light guide plate (as in FIG. 3B, which is not as in FIGS. 6A, 8 or 10). The light incident on the light guide plate propagates through the light guide plate in total reflection, when light hitting reflecting hollowed portion in the form of a wedge 4 on receiving oblique surface 24 (FIG. 3B) is reflected towards the output surface. Reflecting hollowed portion in the form of a wedge 4 is partially divided by dividing flat portion in the form of a strip 5 and light traveling along dividing flat portion 5 propagates through the light guide plate as it is. As such, light can be output in an amount with a controlled, uniform spatial distribution. The light reflected by oblique surface 24 does not have the conditions for total reflection and thus emanates from output surface 21.

In the present embodiment, a backlight for a liquid crystal display device includes light guide plate 3 employing reflecting hollowed portion in the form of a wedge 4 in extracting light to provide total reflection to provide specular reflection to reflect light in an accurately controlled direction. A conventional light guide plate employs a scattering dot to extract light. As such, light distribution must be adjusted after light is extracted from the light guide plate via the scattering dot. In contrast, if light is extracted through specular reflection, particularly in a direction parallel to CCFL 1, adjusting an angular distribution of light before the light is incident on the light guide plate allows the adjusted angular distribution to be held as it is when the light is extracted, since the light only varies in direction. As such, optical element in the form of a prism 9 adjusting a light distribution before light is incident on the light guide plate, allows a small optical element to facilitate emanation of light with an appropriate light distribution characteristic.

Eighth Embodiment

Figure 26:
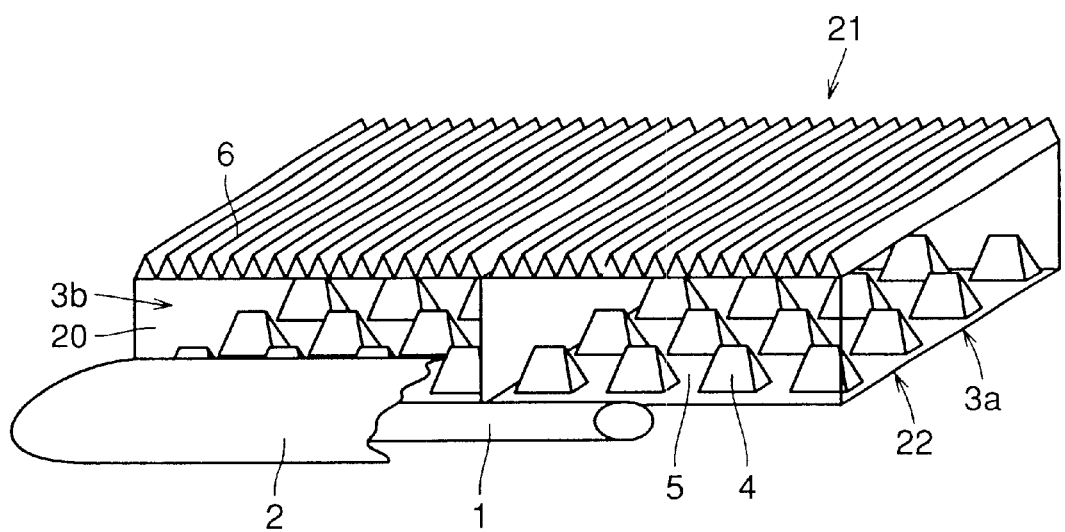
FIG. 26 is a perspective, partially seen-through view of a structure of a backlight in an eighth embodiment of the present invention.
Figure 27:
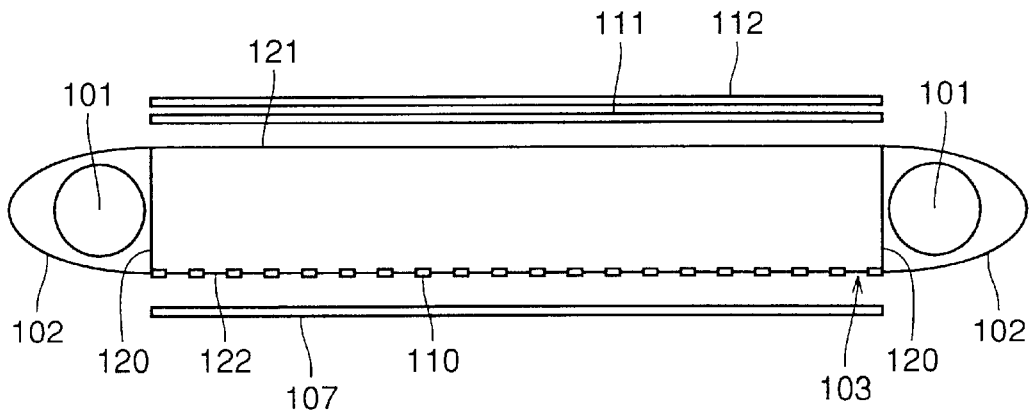
FIG. 27 is a schematic cross section of a structure of a conventional backlight.
Figure 28:
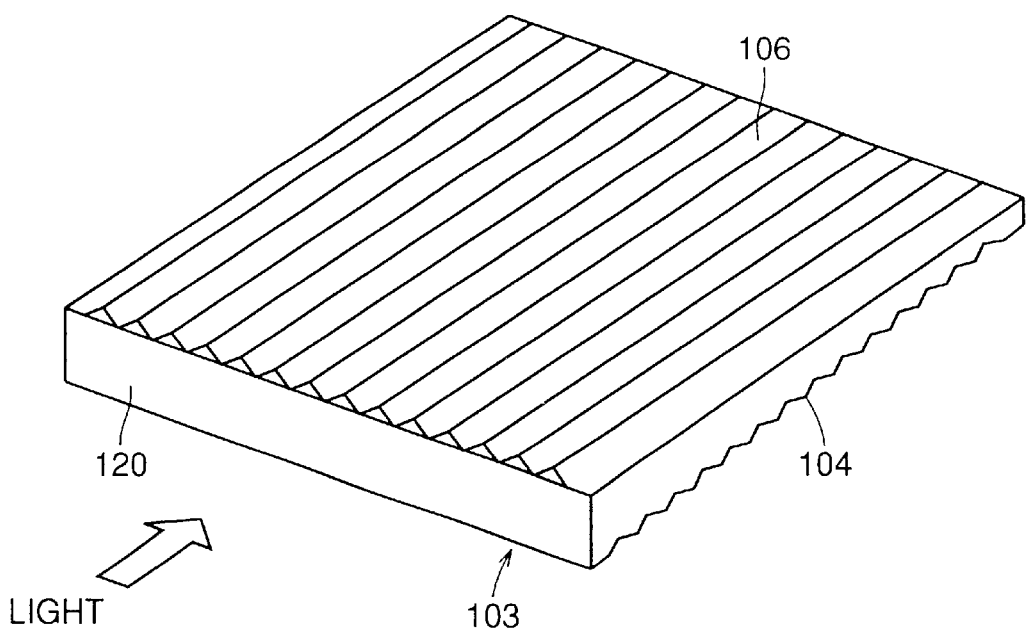
FIG. 28 is a perspective view of a structure of a conventional prism integral light guide plate.

FIG. 26 shows a backlight for a liquid crystal display device in an eighth embodiment of the present invention. In the present embodiment, the light guide plate is not integrally formed. It is configured of two divided portions 3a and 3b coupled in a direction perpendicular to receiving end surface 20. The remainder is basically similar in configuration to the first embodiment, including light guide plates 3a and 3b, reflecting hollowed portion in the form of a wedge 4, dividing flat portion 5 in the form of a strip dividing the reflecting hollowed portion in the form of a wedge, and uneven portion in the form of a prism 6.

If injection-molding is employed to produce light guide plate 3 of a large area with an optical element configuring the uneven portion in the form of a prism, a material therefor must be introduced through a material introducing gate to cover a large area. However, a minute portion of the uneven portion in the form of a prism, such as a vertex thereof, often fails to sufficiently receive the material and it is thus often molded unsatisfactorily. Dividing a light guide plate to divide and thus reduce the size to be injection-molded at a time, allows the light guide plate to be readily, perfectly molded. In dividing a light guide plate, desirably, top surface (output surface) 21 has an uneven portion in the form of a prism with a trough corresponding to a division point and bottom surface 22 has an uneven portion in the form of a prism with a dividing flat portion corresponding to a division point to connect the divided uneven portions at the division point in alignment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A backlight for a liquid crystal display device, comprising:
   a rod-shaped light source supplying light for displaying information on a liquid crystal panel; and
   a light guide plate having a receiving end surface parallel to and adjacent said rod-shaped light source, receiving light from said rod-shaped light source, an output surface located opposite and parallel to a liquid crystal panel, and a bottom surface facing and parallel to said output surface wherein said bottom surface includes a plurality of recesses, each recess having, in a cross-section transverse to said end surface, a triangular shape and including a reflecting surface facing and oblique to said receiving end surface, and a depth extending from said bottom surface into said light guide plate, the recesses being spaced apart and arranged in rows transverse to said receiving end surface, the rows of recesses being separated by planar strip portions of said bottom surface, wherein respective depths of the recesses in each row increase with increasing distance from said receiving end surface and respective widths of said planar strip portions decrease with increasing distance from said receiving end surface.

2. The backlight for a liquid crystal display device, as recited in claim 1, wherein said output surface includes a collecting prism comprising a plurality of aligned simple prisms joined together and having a plurality of parallel alternating valleys and ridges extending in a direction orthogonal to said receiving end surface.

3. The backlight for a liquid crystal display device, as recited in claim 1, wherein said planar strip portions between adjacent recesses have a minimum width of 10 μm.

4. The backlight for a liquid crystal display device, as recited in claim 1, wherein said adjacent pairs of the recesses in each row are separated by a part of said bottom surface at least 10 μm wide.

5. The backlight for a liquid crystal display device, as recited in claim 4, wherein the portions of said bottom surface separating each adjacent pair of the recesses in each row are not coplanar with said planar strip portions of said bottom surface between the rows of the recesses and are closer to said output surface than are said planar strip portions of said bottom surface.

6. The backlight for a liquid crystal display device, as recited in claim 1, wherein said reflecting surfaces facing and oblique to said receiving end surface form an angle between 40° and 50° with respect to said bottom surface.

7. The backlight for a liquid crystal display device, as recited in claim 2, wherein the ridges of each of said simple prisms have an apex angle of at least 100°.

8. The backlight for a liquid crystal display device, as recited in claim 1, wherein said output surface includes a collecting prism comprising a plurality of simple prisms of different sizes joined together and having a plurality of valleys and ridges at non-uniform distances from said bottom surface and extending in a direction transverse to said receiving end surface.

9. The backlight for a liquid crystal display device, as recited in claim 1, wherein said planar strip portions are sinuous.

10. The backlight for a liquid crystal display device, as recited in claim 1, wherein groups of said reflecting surfaces facing and oblique to said receiving end surface form respective angles with said bottom surface that periodically vary with distance from said receiving end surface.

11. The backlight for a liquid crystal display device, as recited in claim 1, wherein said reflecting surfaces facing and oblique to said receiving end surface are cylindrical surfaces concave with respect to said receiving end surface.

12. The backlight for a liquid crystal display device, as recited in claim 1, further comprising a scattering plate located adjacent to said output surface for scattering a component of light traveling in a direction parallel to said receiving end surface.

13. The backlight for a liquid crystal display device, as recited in claim 1, further comprising a scattering plate located adjacent to said output surface for scattering a component of light traveling in a direction in a direction orthogonal to said receiving end surface.

14. The backlight for a liquid crystal display device, as recited in claim 1, further comprising a collecting prism comprising a plurality of adjacent simple prism joined together side-by-side and located between said light source and said receiving end surface.

15. The backlight for a liquid crystal display device, as recited in claim 1, wherein said light guide plate includes two portions divided along a direction perpendicular to said receiving end surface, said two portions being coupled together.

* * * * *